United States Patent [19]
Bartels

[11] Patent Number: 6,156,198
[45] Date of Patent: Dec. 5, 2000

[54] FILTER ELEMENT FOR A FLUID FILTER

[75] Inventor: Antonius J. Bartels, Arnhem, Netherlands

[73] Assignee: Fairey Arlon B.V., Netherlands

[21] Appl. No.: 09/096,451

[22] Filed: Jun. 11, 1998

Related U.S. Application Data

[63] Continuation of application No. PCT/NL96/00453, Nov. 15, 1996.

[30] Foreign Application Priority Data

Dec. 11, 1995 [NL] Netherlands ............................ 1001867

[51] Int. Cl.⁷ .................................................... B01D 29/25
[52] U.S. Cl. .......................... 210/315; 210/317; 210/484; 210/489; 210/493.2; 210/497.01
[58] Field of Search ...................................... 210/484, 485, 210/489, 493.1, 493.2, 497.01, 315, 316, 317, 455

[56] References Cited

U.S. PATENT DOCUMENTS

| | | |
|---|---|---|
| 2,771,156 | 11/1956 | Kasten et al. .......................... 210/493.1 |
| 3,498,464 | 3/1970 | Frosolone .............................. 210/493.1 |
| 5,250,179 | 10/1993 | Spearman . |
| 5,584,987 | 12/1996 | Mules ...................................... 210/440 |

FOREIGN PATENT DOCUMENTS

| | | |
|---|---|---|
| 668812 | 2/1966 | Belgium . |
| 0580491 | 1/1994 | European Pat. Off. . |
| 9204169 | 7/1992 | Germany . |

*Primary Examiner*—Matthew O. Savage
*Attorney, Agent, or Firm*—Todd Deveau; Troutman Sanders, LLP

[57] ABSTRACT

The invention relates to a filter element for a fluid filter incorporating a web of pleated filtering material that is formed into a circumferentially closed cylindrical filter body, which is coaxially supported by a perforate rigid tube and the axial ends of which are sealingly inserted into corresponding annular receiving cavities provided in a rigid bottom end cap at one end and in a rigid annular end cap at the opposite end of the filter body. The cylindrical filter body has its terminal edges embedded in separate sealing rings of a flexible type of rubber or similar elastomeric material and the filter body is sealingly clamped with the sealing rings, and together with the supporting tube, removably between the rigid bottom end cap and annular end cap, respectively.

4 Claims, 2 Drawing Sheets

FILTER ELEMENT FOR A FLUID FILTER

STATEMENT OF RELATED APPLICATIONS

This application is a continuation of Patent Cooperation Treaty Application No. PCT/NL96/00453, filed on Nov. 15, 1996, which claims priority on Netherlands Patent Application No. 1001867, filed on Dec. 11, 1995.

TECHNICAL FIELD

This invention relates to fluid filters provided with a replaceable filter element arranged to be passed radially outwardly by the fluid to be filtered.

BACKGROUND ART

U.S. Pat. No. 5,250,179 discloses a filter element for use in a fluid filter of the type in which the fluid to be filtered is caused to pass radially outwardly through the filter element, said filter element comprising a web of pleated filtering material that is formed into a circumferentially closed cylindrical filter body, which is coaxially supported by a perforate rigid tube surrounding said body and the axial ends of which are sealingly inserted into corresponding annular receiving cavities provided in a rigid bottom end cap at one end and in a rigid annular end cap at the opposite end of the filter body. With this well-known filter element both the rigid bottom-end cap and the rigid annular end cap are fixedly bonded to the axial ends of the cylindrical filter body, thereby assuring that the filter element is completely fluidtight at the ends, so that in use no fluid (including contaminants!) can flow from the space within the cylindrical filter body between the axial ends of the filter body and the rigid bottom end cap or annular end cap towards the exterior of the filter body and vice versa. The cylindrical filter body and the two end caps form a sub-assembly that is adapted to be removably placed into the perforate support tube. The latter is closed by a separate bottom end cap at one end and is provided with an outwardly extending flange at the opposite end, said flange being adapted to sealingly engage an annular lip that extends radially outwardly from the rigid annular end cap, and to be sealingly clamped, together with said lip, onto a support within the housing of the fluid filter.

When, in use, a certain degree of blockage of the filter element has been reached, the element has to be removed from the filter housing or filter chamber for replacement.

From a viewpoint of damage to the environment it is an advantage of the well-known filter element that only the sub-assembly needs to be replaced and is considered as waste and treated accordingly, whereas the perforate support tube can be reused after having placed therein a new sub-assembly.

SUMMARY OF THE INVENTION

The invention provides a further improved filter element of the type above referred to, involving reduced damage to the environment by a blocked filter body, without making concessions as to the quality of the filter element in the unblocked state.

Furthermore, the invention provides a filter element of a simpler construction.

In accordance with this invention the cylindrical filter body of the filter element has its axial ends embedded in separate sealing rings of a flexible type of rubber or similar elastomeric material, said filter body being sealingly and removably clamped together with said sealing rings and said supporting tube, between said rigid bottom end cap and said annular end cap.

The filter element according to the invention can be easily disassembled into parts, said parts being the blocked filter body with the sealing rings connected thereto on one hand and the rigid bottom cap, the rigid supporting tube and the rigid end cap on the other hand. As compared with the well-known filter element above referred to, the rigid bottom end cap and the rigid annular end cap have become reusable as well, while the construction of the filter element according to the invention has become simpler due to the absence of a second bottom end cap and the absence of a sealing flange at the opposite end of the perforate support tube.

Moreover and in contrast to the well-known construction, the filter element construction according to the invention is applicable in a simple manner also in case of a perforate support tube that is placed within the cylindrical filter body.

The embedding of the terminal edges of the cylindrical filter body in the sealing rings on one hand and the fluidtight contact between the sealing rings and the metallic bottom cap and metallic end cap respectively (for which a slight axial clamping force will be required only) guarantee a fluidtight connection of high quality.

Furthermore the invention enables to simply realise a filter element, of which the filter body can be composed of a number of sections to be placed one on top of the other.

In this way, for example filter elements may be realised which have a relatively great length, i.e. a length which is greater than the width of the available filtering fabric from which the filter body is to be formed.

A similar construction is of use when making a filter element of which the filter body, as seen in the axial direction, comprises areas within which the $\mu$-values and/or the type of filtering fabric are different. In those cases a number of filter bodies having each an integrated sealing ring on both ends and may have different $\mu$-values and/or formed of different types of filtering fabric, placed on top of one another around a common supporting tube.

It is to be remarked that it would be no solution to apply separate sealing rings of rubber or similar elastomeric material between the rigid bottom cap and metallic end cap respectively and the respective terminal ends of the cylindrical filter body. For this would not result in a fluidtight connection between the circumferentially zigzag extending terminal edges of the filter body and the separate sealing rings within the rigid bottom cap and end cap.

DESCRIPTION OF A PREFERRED EMBODIMENT

Figure 1:
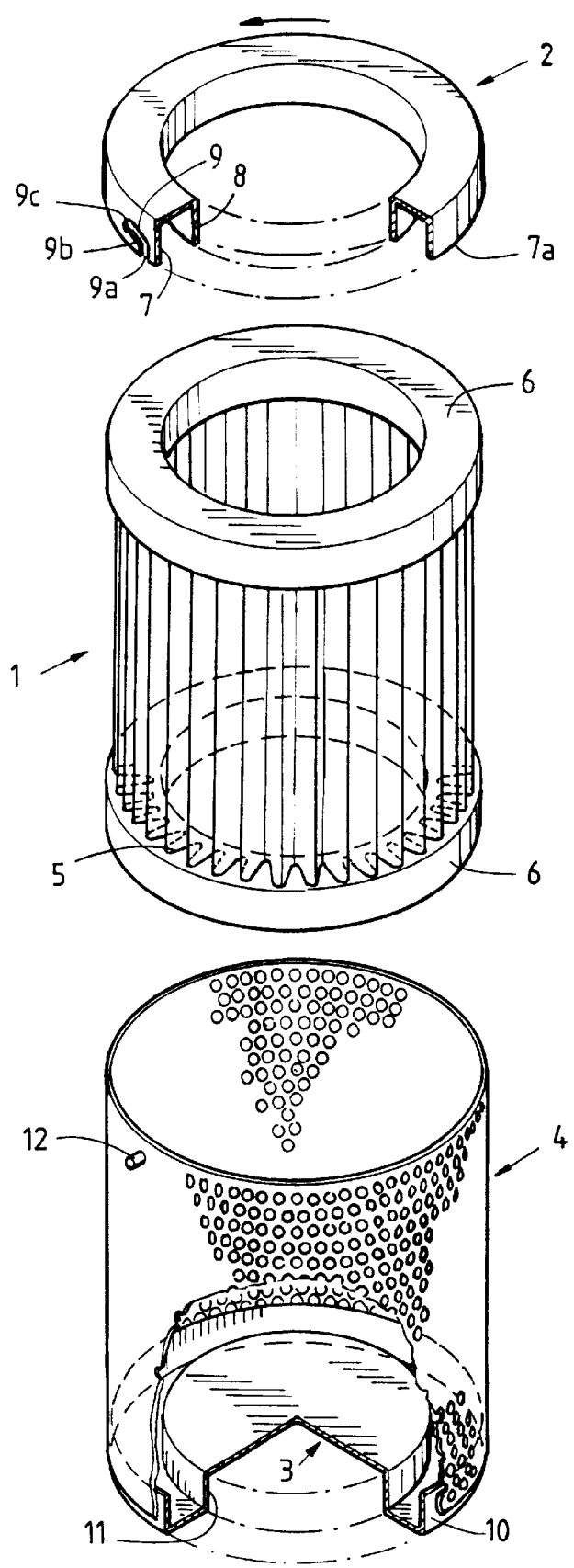
FIG. 1 shows a perspective view of the filter element according to the invention in a disassembled state, wherein portions of the composing parts are cut away for clarity.

With reference to FIG. 1 the filter element shown therein is composed of a filter body 1, a metallic annular cap 2, a metallic bottom cap 3 and a metallic perforate supporting tube 4.

The cylindrical filter body is formed in a well-known manner of a pleated filtering fabric which is often produced as a laminate; the filter body is embedded with its zig-zag extending terminal edges 5 in rings 6 which are formed e.g.

of a visco-elastic polyurethane or a similar suitable elastomeric material.

The step of embedding the terminal edges 5 may be carried out while the rings 6 are still in a soft state in a mould. Preformed rings 6, provided with an annular groove for receiving the terminal edges 5 to be embedded, may also be used. In that case, after the respective terminal edges 5 being received in such grooves, the grooves are filled up with a suitable filling material.

The metallic end cap 2 has a U-shaped cross-section, as seen in the axial direction and thus confines an annular space for receiving a ring 6 that makes part of the filter body 1. The outer and inner circumferential walls of the annular receiving space are indicated at 7 and 8 respectively. At a few circumferentially spaced locations of the outer peripheral wall 7 a slot 9 is provided, which makes part of a bayonet catch to be described below. This slot has a portion 9a that extends, from the free terminal edge 7a, at first in the axial direction and then turns to a circumferentially sloping slot portion 9b which in turn ends up into a holding seat 9c.

Similarly the metallic bottom cap 3 has an annular space confined by an outer circumferential wall 10 and an inner circumferential wall 11 for receiving a ring 3 making part of the filter body 1.

In the example shown in the drawing the supporting tube 4 has its lower edge portion welded or riveted to the outer circumferential wall 11 of the bottom cap 3.

A plurality of pin-shaped projections 12 is provided adjacent the upper terminal edge of the supporting tube 4, each of these projections being adapted to cooperate with a slot 9 in the metallic end cap 2 in the manner of a bayonet catch.

When assembling the filter element from the parts shown in the drawing, the filter body 1 is inserted into the supporting tube 4, so that the filter body will be supported with its lower sealing ring 3 onto the bottom surface of the annular deepened receiving space of the bottom cap 3. In this stage the upper sealing ring 6 projects with its upper end face slightly beyond the upper edge of the supporting tube 4. The end cap 2 is then placed over the upper sealing ring 6 and the upper edge of the supporting tube 4 in a position which will allow the pin-shaped projections 12 to enter into the axial slot portions 9a. The pin-shaped projections 12 having thus entered into engagement with the slots 9, the end cap 2 is turned in the arrow direction shown in the drawing, to cause the pin-shaped projections 12 to move into the sloping slot portions 9b and thereby pull the end cap 2 in the axial direction.. In this way an axially directed clamping force will be exerted, due to which the two sealing rings 6 will become with their end faces in sealing contact with the bottom faces of the annular receiving spaces in the end cap 2 and the bottom cap 3 respectively.

Figure 2:
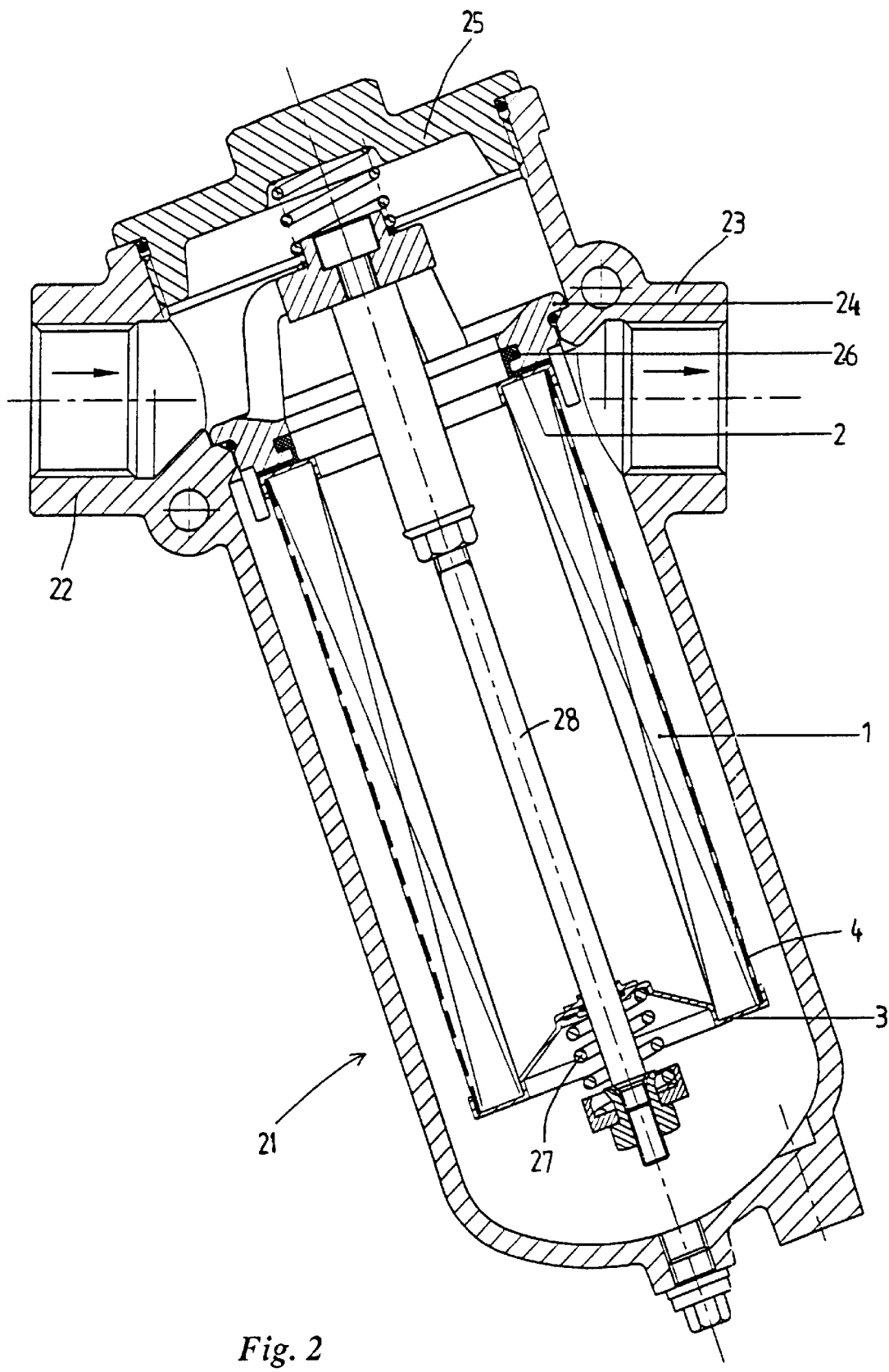
FIG. 2 shows a filter element according to the invention in the assembled state and mounted in the housing of an oil filter.

The finished filter element may then be placed in a well-known manner into a filter housing 21 as shown in FIG. 2. The filter housing 21 has an oil inlet 22 and an oil outlet 23. In the connecting area between the inlet and outlet a pressure ring 24 is sealingly pressed onto a seat within the housing, due to the spring pressure exerted by a cover 25. The pressure ring 24 is provided with a gasket 26 for sealing engagement with the end gap 24 of the filter element. The filter element is sealingly pressed against the gasket 26 by means of a coil spring 27 provided around the free end of a rod 28 that is carried by the pressure ring 24 and sealingly extends through a central opening to be made in the bottom cap 3.

In the example shown in the drawing, in which the supporting tube 4 is provided on the outer side of the filter body, the fluid to be filtered will enter through the central opening of the end cap 2 and flow outwardly through the filter body. The supporting tube, however, could also be placed within the filter body in which case the fluid to be filtered would flow in the opposite direction, while the inlet and outlet of the filter housing would change.

The above description of a preferred embodiment is for example purposes only and is not meant to limit the scope or spirit of the invention, or its equivalents, as defined by the appended claims.

What is claimed is:

1. A filter element for use in a fluid filter of the type in which the fluid to be filtered is caused to pass radially outwardly through the filter element, said filter element comprising a web of pleated filtering material that is formed in a circumferentially closed cylindrical filtering body, said filtering body having each of its axial ends embedded in a sealing ring of a flexible elastomeric material;

a single perforate rigid tube surrounding a radially outer circumferential surface of said filtering body said filtering body to radially support the latter;

a closed, rigid bottom end cap and a rigid top end cap, each of said caps having an annular, axially directed cavity for receiving an axial end of said filtering body, each of said cavities having a bottom and an inner and an outer circumferential wall, whereas said top end cap has a central inlet opening for liquid to be filtered;

releasable connecting means disposed on said outer circumferential wall of said top end cap and one end of said rigid tube for releasably connecting said top end cap to said one end of said rigid tube, wherein said cylindrical filtering body, said bottom and top end caps and said perforate rigid tube are axially and removably clamped together, with said sealing rings sealingly engaging the bottom walls of the respective annular cavities and with the perforate rigid tube engaging the outer circumferential walls of the respective annular cavities while functioning to space the two end caps from one another.

2. A filter element according to claim 1, wherein said releasable connecting means is a release connection of the type that attracts said rigid tube towards the respective cap.

3. A filter element according to claim 1, further comprising means for fixedly connecting the other end of said rigid tube to the corresponding circumferential wall portion of the other cap.

4. A filter element according to claim 1, wherein said releasable connecting means is a release connection of the bayonet catch type, comprising a circumferentially sloping slot in said one end of said rigid tube or in said circumferential wall portion, said slot cooperating with a pin-shaped projection, extending radially from said circumferential wall portion or from said one end of said rigid tube respectively.

* * * * *